United States Patent [19]
Abe et al.

[11] Patent Number: 5,873,590
[45] Date of Patent: Feb. 23, 1999

[54] BICYCLE

[75] Inventors: Minoru Abe, Katano; Naoki Tomiyama, Settsu; Atsushi Ueda, Takatsuki; Yasuhiko Eguchi, Neyagawa; Koji Hiramoto, Hirakata, all of Japan

[73] Assignee: Exedy Corporation, Neyagawa, Japan

[21] Appl. No.: 800,190

[22] Filed: Feb. 13, 1997

[30] Foreign Application Priority Data

| Feb. 19, 1996 | [JP] | Japan | ................................ 8-030583 |
| Feb. 19, 1996 | [JP] | Japan | ................................ 8-030584 |
| Feb. 19, 1996 | [JP] | Japan | ................................ 8-030585 |

[51] Int. Cl.$^6$ ..................................................... B62M 1/00
[52] U.S. Cl. ........................................... 280/259; 280/260
[58] Field of Search ................................ 280/236, 259, 280/260, 280, 281.1, 288.3

[56] References Cited

U.S. PATENT DOCUMENTS 446,354  2/1891  Kane ........................................ 280/260
3,233,916  2/1966  Bowden ............................ 280/288.3 X

FOREIGN PATENT DOCUMENTS 4001728  12/1991  Germany ................................ 280/259
183422  5/1992  Taiwan .

*Primary Examiner*—Robert J. Oberleitner
*Assistant Examiner*—C. T. Bartz
*Attorney, Agent, or Firm*—Shinjyu An Intellectual Property Firm

[57] ABSTRACT

A bicycle is provided with a frame and a drive portion. The frame is at least partially hollow, and at least part of the drive portion is disposed in an interior of the frame. The drive portion includes a crank and a plurality of transmission means, in which one of the transmission means rotates another transmission means at a rotational speed higher than a rotational speed of the crank, which in turn rotates the rear wheel of the bicycle.

9 Claims, 7 Drawing Sheets

BICYCLE

BACKGROUND OF THE INVENTION

A. Field of the invention

The present invention relates to a bicycle, and more particularly to a drive mechanism on a bicycle for transmitting power to the rear wheel.

B. Description of the related art

In general, a bicycle includes a frame, a front fork, a steering portion, a front and rear wheel, and a drive portion for rotating the rear wheel. The drive portion includes a chain wheel and a crank rotatably supported on the frame, a sprocket mounted on the rear wheel, and a chain extending between the chain wheel and the sprocket. The number of teeth on the chain wheel is larger than that on the sprocket, thereby rotating the rear wheel faster than the chain wheel.

Because power is transmitted directly from the chain wheel to the sprocket on the rear wheel via the chain, the chain wheel must be much larger than the sprocket. However, because the rotational axis of the chain wheel and the rotational axis of the rear wheel are generally the same height above the ground, there is relatively little clearance between the ground and the bottom of the chain wheel.

In addition, on some bicycles a chain cover is mounted around the chain in order to help prevent the rider's clothes from being soiled or entangled by the drive portion. However, because the chain cover is a separate part, the number of the parts of the bicycle is increased, thus requiring addition work during assembly. In addition, a chain cover that completely surrounds the chain would further reduce the clearance between the bottom of the chain wheel and the ground.

SUMMARY OF THE INVENTION

It is therefore an object of the present invention to reduce the size of the drive portion of a bicycle.

Another object of the present invention is increase the amount of clearance between the bottom of the chain wheel of a bicycle and the ground.

Yet another object of the present invention is to reduce the possibility of damage to the chain and chain wheel of a bicycle when the bicycle is driven over large objects.

A bicycle of the present invention includes a frame having a drive case, the drive case being mounted on the frame such that at least part of the drive case is disposed in an interior of the frame. The bicycle also includes a running portion having a rear wheel mounted on a rear portion of the frame, and a drive portion. The drive portion includes a crank rotatably supported on the drive case, a first transmission means disposed in the drive case, and a second transmission means. The first transmission means rotates the second transmitting means at a rotational speed higher than a rotational speed of the crank, and the second transmission means rotates the rear wheel.

According to one embodiment, the first transmission means has a first sprocket mounted on the crank, a second sprocket connected to the second transmission means and disposed within the drive case, and a chain extending between the first sprocket and the second sprocket. Both the first sprocket and the second sprocket have a plurality of teeth, with the first sprocket having more teeth than the second sprocket.

In another embodiment, the first transmission means includes a first bevel gear mounted on the crank within the drive case, a shaft having a second bevel gear and a third bevel gear disposed on both ends thereof, the second bevel gear engaged with the first bevel gear, and a fourth bevel gear connected to the second transmission means, the fourth bevel gear engaged with the third bevel gear. All bevel gears have a plurality of teeth, the first bevel gear having more teeth than the second bevel gear, and the third bevel gear having more teeth than the fourth bevel gear.

The frame of the bicycle of the present invention includes a hollow main frame, a rear end of the main frame including a hollow seat stay bifurcated downward at an oblique angle therefrom, and the second transmission means being disposed in an interior of the seat stay. At least a portion of the drive case is disposed in an interior of the frame.

The gear teeth ratio of the second transmission means of the bicycle may be modified to further increase the rotational speed of the rear wheel.

According to a third embodiment of the present invention, a bicycle includes a frame having a drive case, a running portion including a rear wheel mounted on a rear portion of the frame, and a drive portion. The drive portion includes a crank rotatably supported on the drive case, a first transmission means, a second transmission means including a planetary gear mechanism disposed within the drive case, and a third transmission means. The first transmission means rotates the second transmission means, the second transmitting means rotates the third transmission means at a rotational speed higher than the rotational speed of the crank, and the third transmission means rotates the rear wheel. The first speed transmission means includes a first sprocket mounted on the crank within the drive case, a second sprocket connected to the second transmission means, and a chain which extends between the first sprocket and the second sprocket.

The planetary gear mechanism includes a shaft rotatably supported on the drive case and coupled to the third transmission means, a sun gear fixed to the shaft, an internal gear fixed to the drive case, at least one planetary gear disposed between the sun gear and the internal gear and engaged therewith, and a coupling member coupling the planetary gears together with the first transmission means.

The frame of the bicycle is hollow, at least a portion of the drive case is disposed in an interior of the frame, and the second transmission means is disposed within the frame.

The gear teeth ration of the third transmission means may be modified to further increase the rotational speed of the rear wheel.

Other objects, features, aspects and advantages of the present invention will be apparent from the following detailed description of the present invention when taken in conjunction with the accompanying drawings, in which like reference numerals designate the same or similar parts throughout.

DESCRIPTION OF THE PREFERRED EMBODIMENTS

Figure 1:
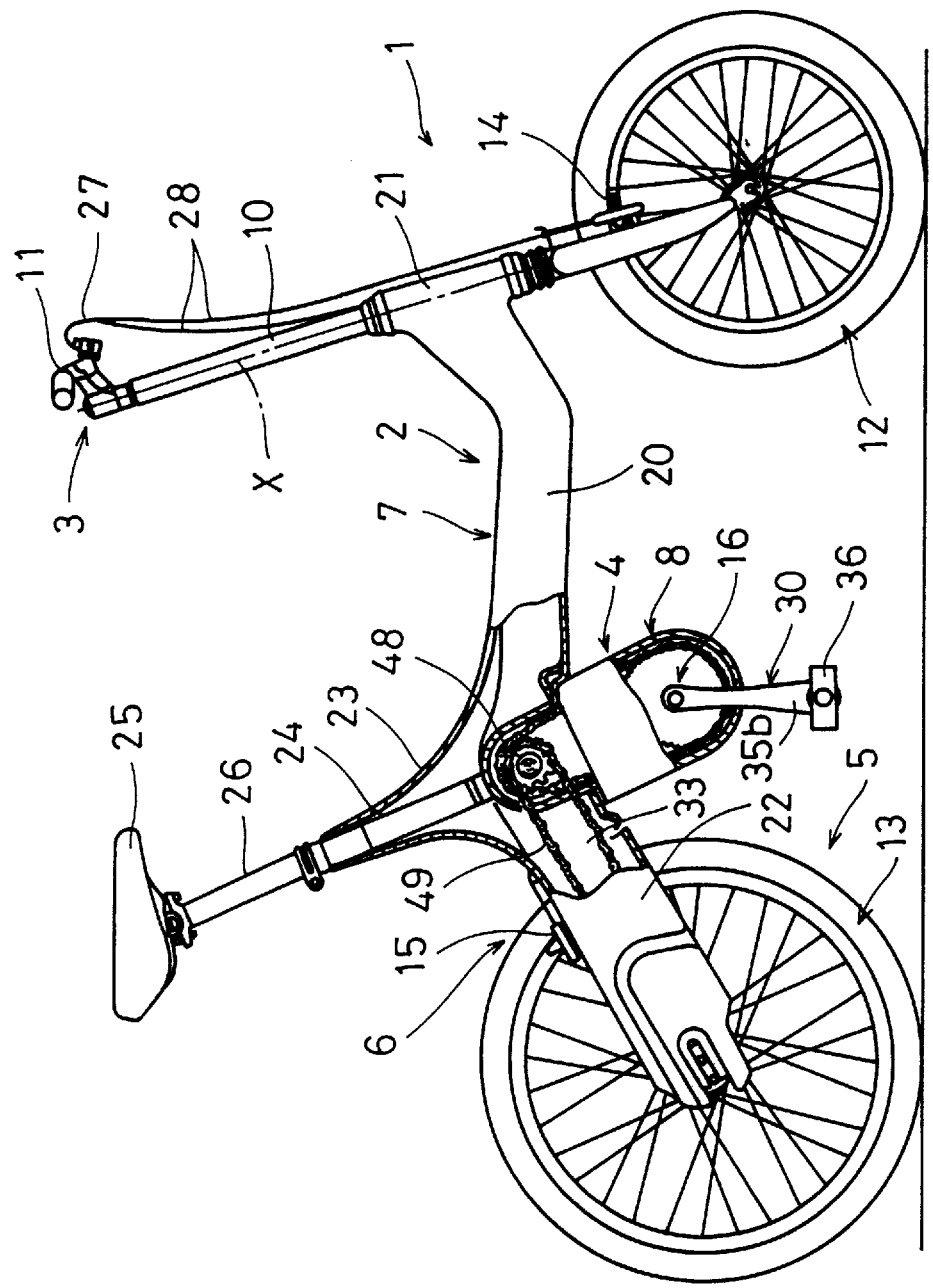
FIG. 1 is a side elevation of a bicycle according to one embodiment of the present invention, showing a part cutaway of a drive portion.

FIG. 1 shows a bicycle according to one embodiment of the present invention. A bicycle 1 includes a frame 2, a front fork 10, a steering portion 3 which includes a handle 11 fixed at an upper end of the suspension fork 10, a drive portion 4 disposed on the frame 2, a running portion 5 which includes a front wheel 12 and a rear wheel 13 disposed in a front portion and a rear portion of the frame 2, and a braking portion 6 which includes brakes 14 and 15 for braking the front and rear wheels 12 and 13.

The frame 2 includes a frame body 7, and a drive case 8 mounted on a lower portion of the frame body 7. The frame body 7 is generally horizontal to the ground and includes a main frame 20 having a generally hollow, oval-shaped cross-section, a head portion 21, a seat stay 22, and a seat support portion 23.

A front portion of the main frame 20 extends upward at an oblique angle, and the head portion 21 is formed at an end of the front portion. The head portion 21 extends along a axis X, and extends rearward at an oblique angle. The seat stay 22 is bifurcated from the rear portion of the main frame 20 and extends rearward. The rear wheel 13 is mounted on a rear end of the seat stay 22, and the seat stay 22 has a hollow space in its interior. The seat support portion 23 extends at an oblique angle from a rear portion of the main frame 20. A seat tube 24 also extends rearward at an oblique angle, and is mounted in the interior of the seat support portion 23. A seat post 26 to which a saddle 25 is fixed at its top portion is adjustably fitted to the seat tube 24.

The steering portion 3 includes the handle 11 fixed to an upper end of the front fork 10. A pair of front and rear brake levers 27 are mounted on both end portions of the handle 11. Each brake lever 27 is connected to a front or rear brake 14, 15 by a brake wire 28.

Figure 2:
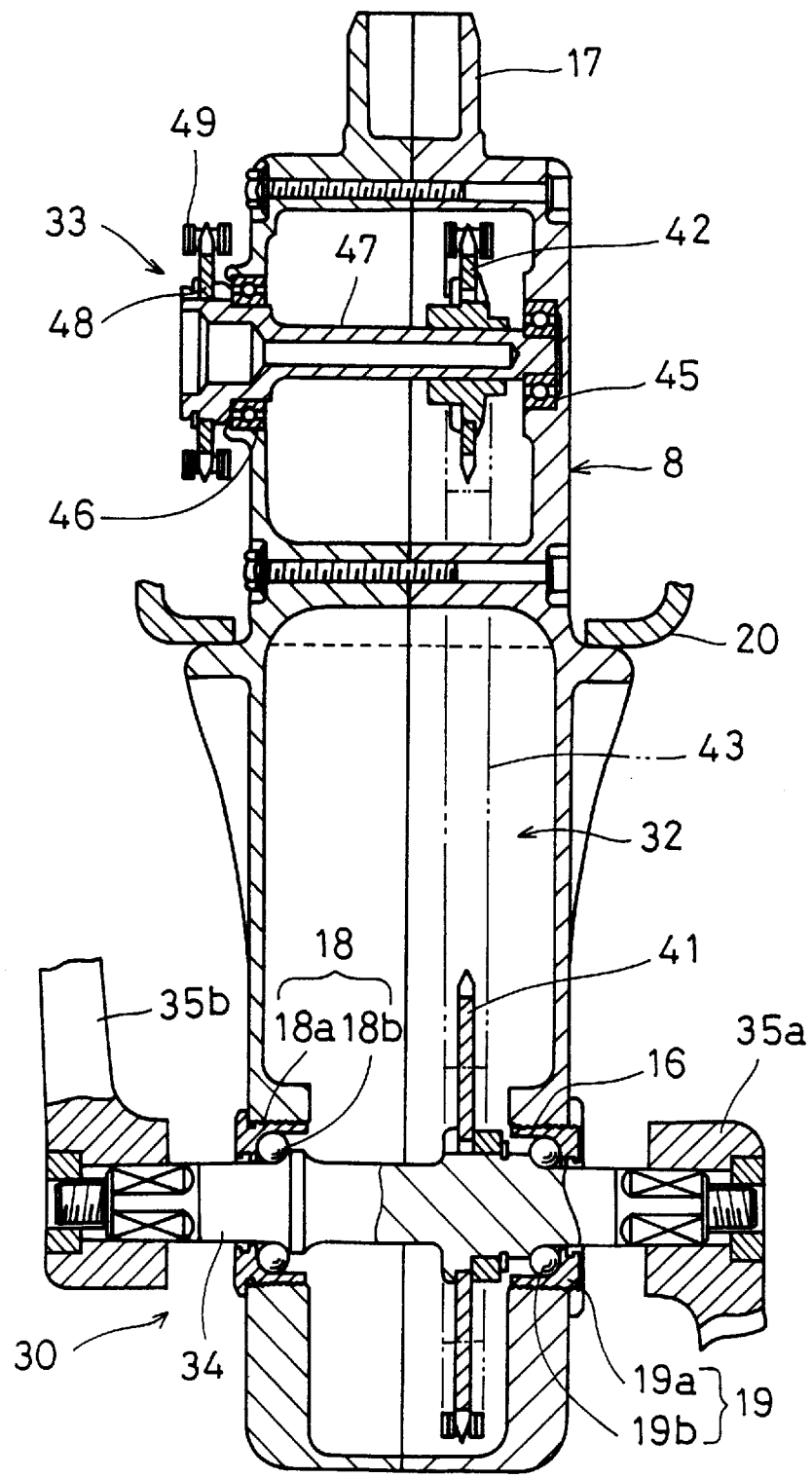
FIG. 2 is a part fragmentary, part cross-sectional view of the drive portion depicted in FIG. 1.

A drive case 8 is mounted on the bottom of the main frame 20, and also extends rearward at an oblique angle. As shown in FIG. 2, the drive case 8 is formed from two portions, and further includes a hanger portion 16 for rotatably supporting a crank 30. A mounting projection 17 is formed on the top of the drive case 8, and is fitted into the interior of the seat tube 24. The hanger part 16 further includes a first crank bearing 18, which includes a fixed cup 18a and a ball bearing 18b, and a second crank bearing 19, which includes an adjusting cup 19a and a ball bearing 19b. A crank shaft 34 is rotatably supported on the hanger part 16 by first crank bearing 18 and second crank bearing 19. A pair of right and left crank arms 35a and 35b are fixed to both ends of the crank shaft, and two pedals 36 are rotatably mounted at the tip ends of the crank arms 35a and 35b.

The drive portion 4 further includes a first transmission portion 32, and a second transmission portion 33. The first transmission portion 32 includes a first sprocket 41 mounted on a mid-portion of the crank shaft 34, a second sprocket 42 disposed in the upper portion of the drive case 8, and a chain 43 extending between the first and second sprockets 41 and 42. The number of teeth on the first sprocket 41 is approximately one third the number of teeth on the second sprocket 42, for example 39:13. As a result, it is possible to rotation the second sprocket 42 three times faster than the first sprocket 41.

The second sprocket 42 is mounted on an output shaft 47 rotatably supported on the upper portion of the drive case 8 through bearings 45 and 46. One end of the output shaft 47 projects out from a side wall of the drive case 8 within the main frame 20.

The second transmission portion 33 has a third sprocket 48 mounted on the projecting end of the output shaft 47, a fourth sprocket (not shown) mounted on the rear wheel 13, and a chain 49 which extends between the third sprocket 48 and the fourth sprocket. The number of teeth on the third sprocket 48 is the same as that on the fourth sprocket.

The operation of the bicycle according to the present embodiment will now be described.

When the rider pushes on the pedals 36 to rotate the crank 30, the first sprocket 41 is rotated so that power is transmitted to the second sprocket 42 through the chain 43. At this time, the number of rotations of the crank 30 is increased three times by the gear ratio of the first sprocket 41 and second sprocket 42. This rotation is transmitted to the rear wheel 13 through the output shaft 47, the third sprocket 48 and the chain 49. As a result, the rear wheel 13 is rotated three times as fast as that of the rotation of the crank 30 so that the bicycle 1 is advanced.

In the bicycle of this embodiment, since the drive portion is enclosed within the frame 2, a chain cover or the like is unnecessary. Thus, the rider's clothing will not be soiled or entangled by the chain and the sprocket. In addition, since the chain 43 does not extend directly from the first sprocket 41 to the fourth sprocket on the rear wheel as on a conventional bicycle, there is additional space between the bottom of the drive case 8 and the ground. And unlike on a conventional bicycle, there is also a space between the drive case 8 and the rear wheel 13. Thus, even if the bicycle rides over a curb or other large object, there is almost no fear that there will be damage to the chains 43 or 49, or the seat stay 22.

The first embodiment of the present invention may be modified in a number of ways. For example, it is possible to further accelerate rotation in the second transmission portion 33 by placing more teeth on the third sprocket 48 than on the fourth sprocket mounted on the rear wheel 13. It is also possible to reduce the gear ratio in the first transmission portion 32, and thereby reduce the diameter of the first sprocket 41 and make the drive portion 4 more compact.

In addition, the structure of the first transmission portion 32 or the second transmission portion 33 is not limited to a chain and sprocket structure and may be replaced by any other suitable mechanism such as a bevel gear, a planetary gear mechanism, a belt mechanism or the like.

Figure 3:
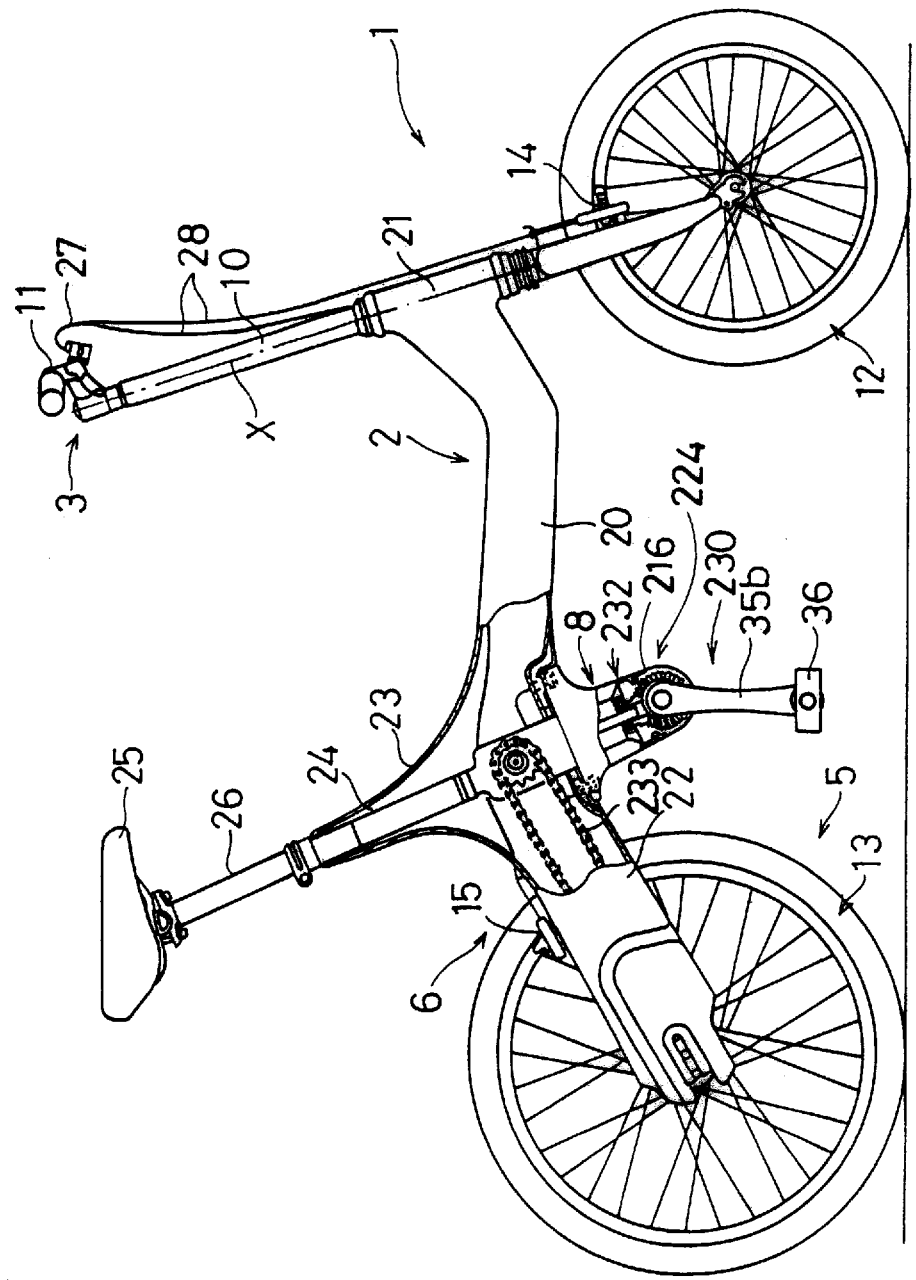
FIG. 3 is a side elevation of a bicycle according to another embodiment of the present invention, showing a part cutaway of a drive portion.

FIG. 3 shows a bicycle 1 according to a second embodiment of the present invention. The bicycle 1 has the same structure as that of the first embodiment except for the drive portion 224, thus any unnecessary description will be omitted.

The drive portion 224 includes a crank 230 rotatably supported on a hanger part 216, a first transmission portion 232, and a second transmission portion 233 for transmitting the drive force from the first transmission portion 232 to the rear wheel 13.

Figure 4:
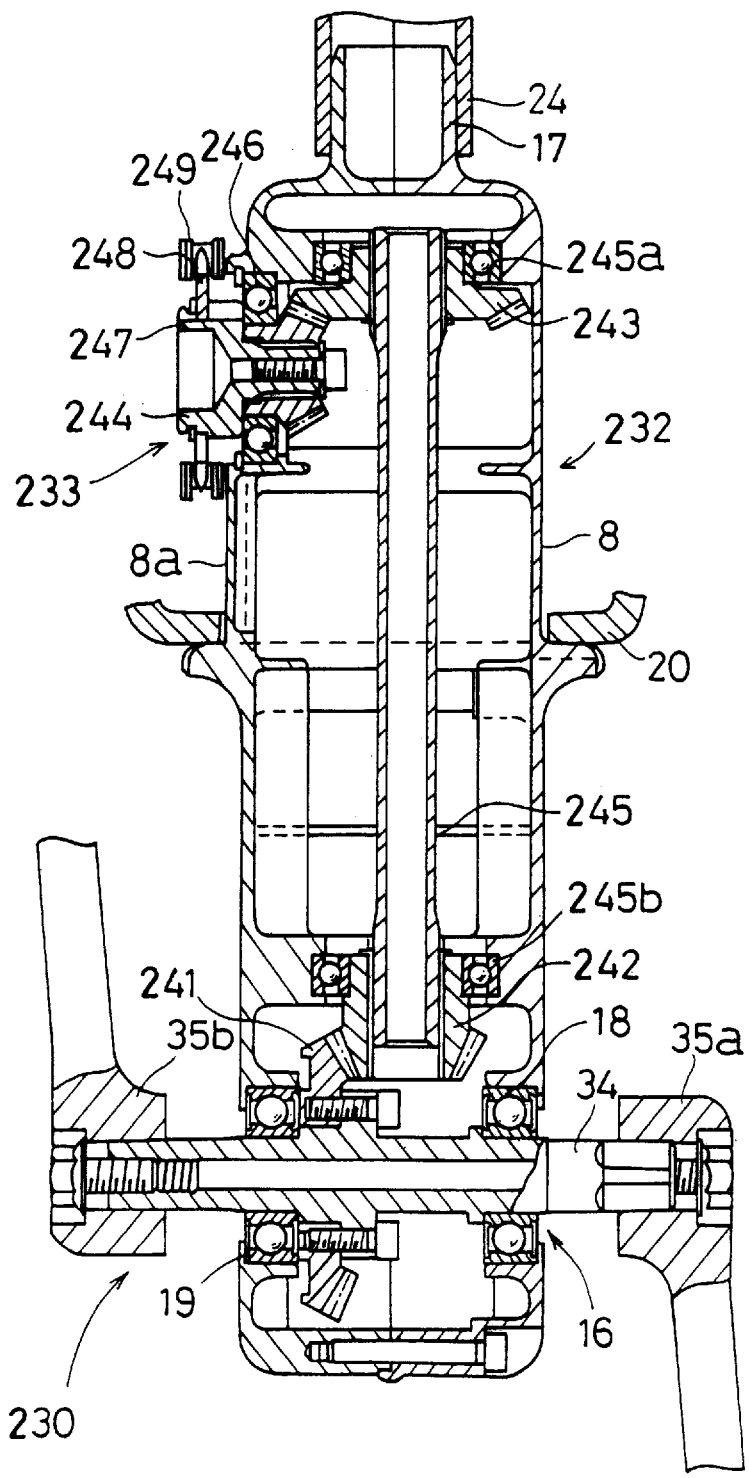
FIG. 4 is a part fragmentary, part cross-sectional view of the drive portion depicted in FIG. 3.

As shown in FIG. 4, the first transmission portion 232 includes four bevel gears 241 to 244. The first bevel gear 241 is fixed to the crank shaft 34 in the interior of the drive case 8. The second bevel gear 242 is fixed to a lower end of a hollow intermediate shaft 245 extending vertically in the central portion of the drive case 8, and is engaged with the first bevel gear 241. A third bevel gear 243 is fixed to an upper end of the intermediate shaft 245. The number of teeth on the second bevel gear 242 is smaller than that on the first bevel gear 241. The second and third bevel gears 242 and 243 are rotatably supported on bearings 245a and 245b.

A fourth bevel gear 244 is fixed to a proximal end of an output shaft 247, and is engaged with the third bevel gear 243. The number of the teeth of the fourth bevel gear 244 is less than that on the third bevel gear 243. The fourth bevel gear 244 is rotatably supported on bearings 246 disposed on an upper portion of a side wall 8a of the drive case 8. A portion of the output shaft 247 projects out from the drive case 8 but within the main frame 20. A sprocket 248 is fixed to the tip end of the output shaft 247.

The gear ratio of the first and second bevel gears 241 and 242 is set at, for example, 2:1. If the gear ratio of the third and fourth bevel gears 243 and 244 is set at 2:1, the overall gear ratio is 4:1. In this case, the first transmission portion 232 multiplies the number of rotations of the crank 230 by four times.

The second transmission portion 233 includes a output sprocket 248 mounted on the projecting end of the output shaft 247, a second sprocket (not shown) mounted on the rear wheel 13, and a chain 249 extending between the output sprocket 248 and the second sprocket. The number of teeth on the output sprocket 248 is the same as that on the second sprocket, for example, 13.

The operation of the bicycle according to the second embodiment of the present invention will now be described.

When the rider pushes on the pedals 36 to rotate the crank 230, the bevel gears 241 to 244 are rotated, so that the rotation of the crank 230 is transmitted to the output shaft 247. Depending on the gear ratios of the bevel gears 241 to 244, the number of rotations of the crank 230 can be multiplied, for example, four times. This rotation is transmitted to the rear wheel 13 through the output shaft 247, the output sprocket 248 and the chain 249. As a result, the rear wheel 13 is rotated four times as fast as that of the rotation of the crank 230 so that the bicycle 1 is advanced.

According to this embodiment, by using the four bevel gears 241 to 244 in the first transmission portion 232, it is possible to obtain a large gear ratio with a compact structure, thereby allowing the size of the drive portion 224 to be reduced. And because a chain is not used in the first transmission portion 232, the amount of chain maintenance required on the bicycle may be reduced.

In the bicycle of this embodiment, since the drive portion is enclosed within the frame 2, a chain cover or the like is unnecessary. Thus, the rider's clothing will not be soiled or entangled by the chain and the sprocket. In addition, since there is no direct connection between the first transmission portion 232 and the second sprocket on the rear wheel 13, there is additional space between the bottom of the drive case 8 and the ground. And unlike on a conventional bicycle, there is also a space between the drive case 8 and the rear wheel 13. Thus, even if the bicycle rides over a curb or other large object, there is almost no fear that there will be damage to the chain 249, or the seat stay 22.

The second embodiment of the present invention may be modified in a number of ways. For example, it is possible to accelerate the rotation of the second transmission portion 233 by placing more teeth on the output sprocket 248 than on the second sprocket mounted on the rear wheel 13. It is also possible to reduce the gear ratio in the first transmission portion 232, and thereby reduce the diameters of the bevel gears 241 and 243 and to make the drive portion 224 more compact. In addition, the structure of the second transmission portion 233 is not limited to a chain and sprocket structure. It is possible to use any other suitable mechanism such as a bevel gear, a belt mechanism or the like.

Figure 5:
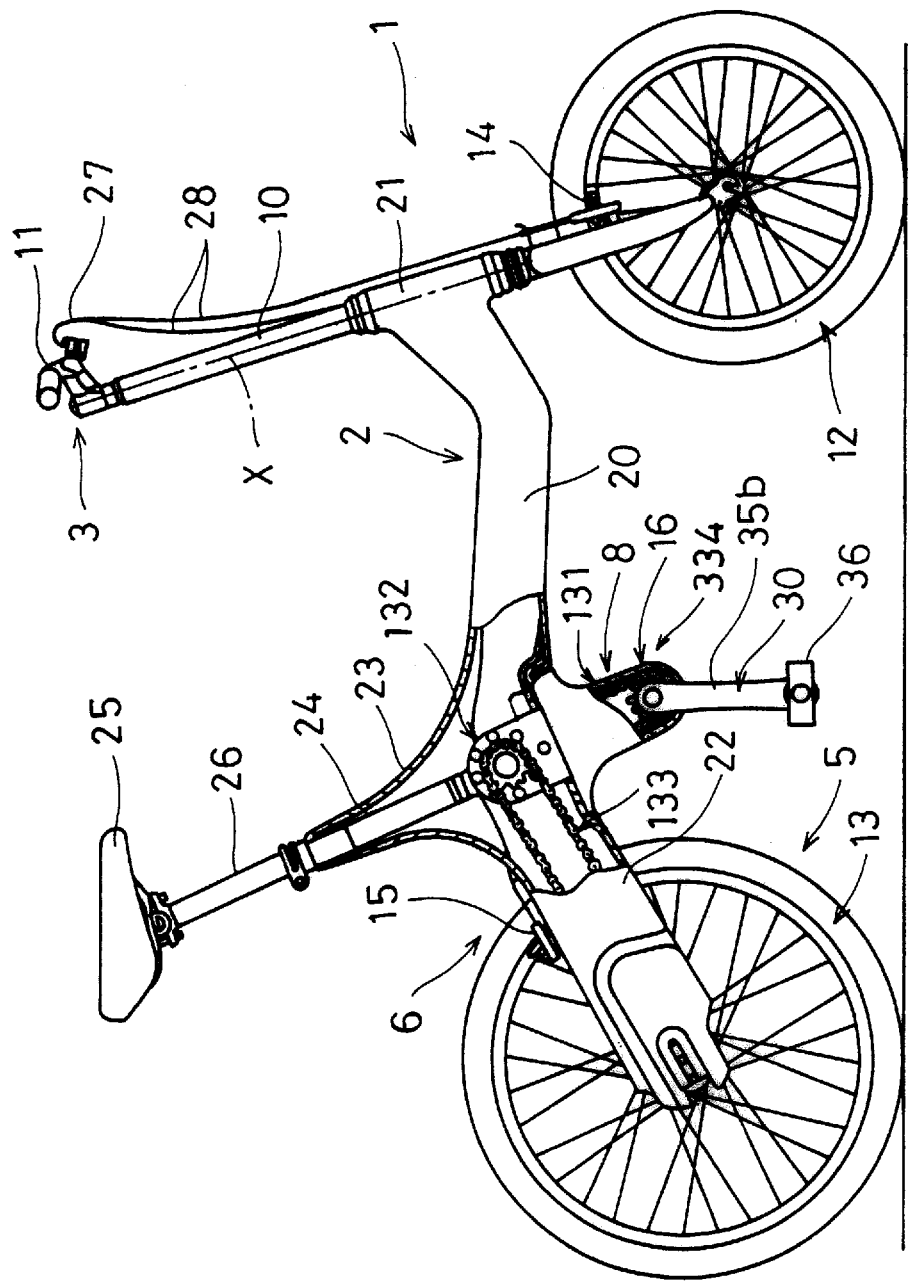
FIG. 5 is a side elevation of a bicycle according to yet another embodiment of the present invention, showing a part cutaway of a drive portion.

FIG. 5 shows a bicycle 1 according to a third embodiment of the invention. The bicycle 1 has the same structure as that of the first embodiment except for the drive portion 334 and the drive case 8, thus any unnecessary description will be omitted.

Figure 6:
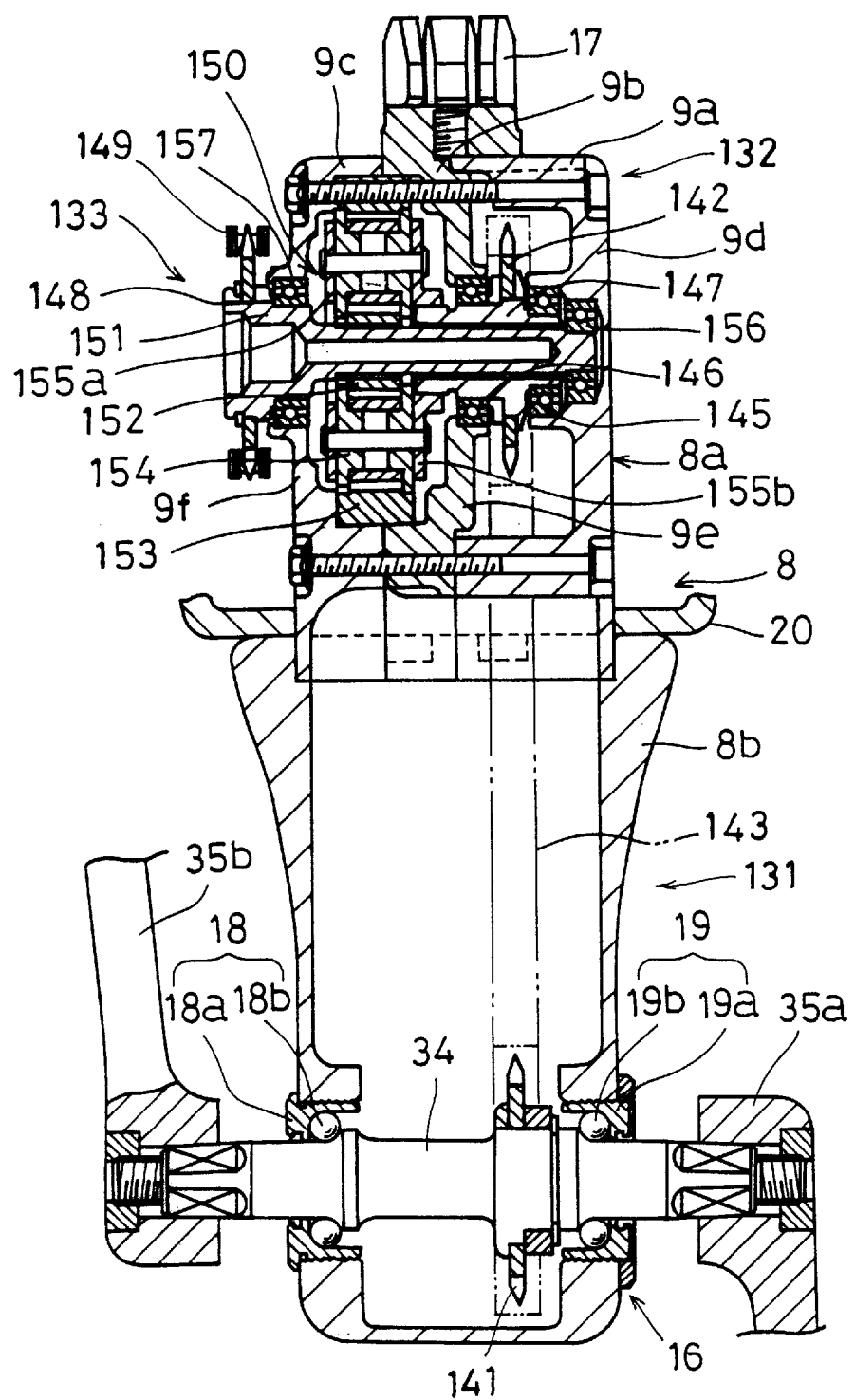
FIG. 6 is a part fragmentary, part cross-sectional view of the drive portion depicted in FIG. 5.

As shown in FIG. 6, the drive case 8 includes an upper case 8a and a lower case 8b. The drive case 8 is mounted on a lower portion of the main frame 20, and the upper case 8a is attached to the main frame 20 at a coupling portion disposed between the upper case 8a and the lower case 8b. The upper case 8a is further divided into three case segments 9a, 9b and 9c. The case segment 9a includes a side wall 9d which is about half the length of the upper case 8a. The center case segment 9b includes an intermediate wall 9e, and a mounting projection 17 clamped between the case segments 9a and 9c. The projection 17 is fitted into the interior of the lower end of the seat tube 24. The case segment 9b has a length which is about one fourth of the upper case 8a. The case segment 9c includes a side wall 9f, and a length which is about one fourth of the upper case 8a.

The lower case 8b is a box which is opened at an upper end and connected to the upper case 8a. The lower case 8b includes a hanger part 16 for rotatably supporting the crank 30. A first bearing portion 18 includes a fixed cup 18a and a ball bearing 18b, and a second bearing portion 19 includes an adjusting cup 19a and a ball bearing 19b. Both first and second bearing portions 18 and 19 are mounted on the hanger part 16, and a crank shaft 34 is rotatably supported by the first and second bearings 18 and 19.

The drive portion 334 includes a first transmission portion 131, a second transmission portion 132, and a third transmission portion 133. The first transmission portion 131 includes a first sprocket 141 mounted on a mid-portion of the crank shaft 34, a second sprocket 142 disposed in the upper case 8a of the drive case 8, and a chain 143 extending between the first sprocket 141 and the second sprocket 142. The number of teeth on the first and second sprockets 141 and 142 is, for example, 13. The second sprocket 142 is mounted on a hollow intermediate shaft 147 rotatably supported by bearings 145 and 146. The bearings 145 are disposed on the side wall 9d of the case segment 9a, and the bearings 146 are disposed on the intermediate wall 9e of the case segment 9b.

Figure 7:
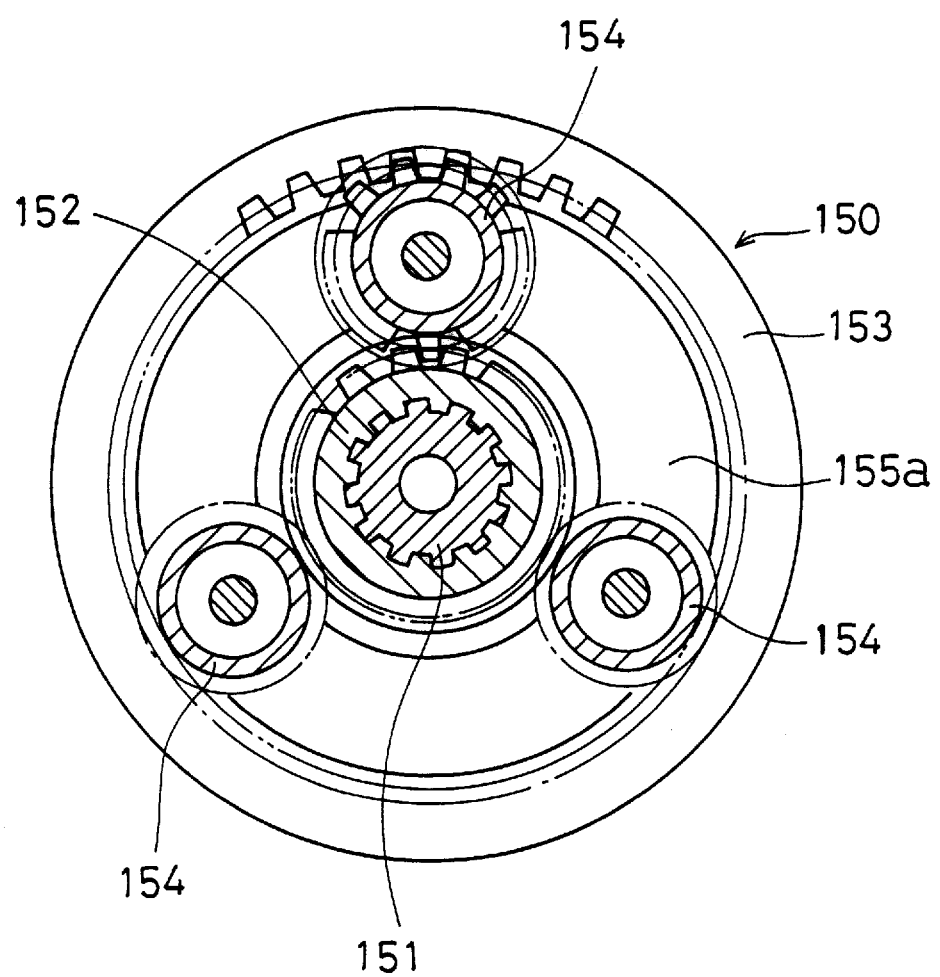
FIG. 7 is a front view a planetary gear mechanism disposed in the drive portion of the bicycle depicted in FIG. 5.

The second transmission portion 132 includes a planetary gear mechanism 150. As shown in FIGS. 6 and 7, the planetary gear mechanism 150 includes an output shaft 151, a sun gear 152, an internal gear 153, three planetary gears 154, and a pair of right and left carriers 155a and 155b for connecting the three planetary gears 154.

The output shaft 151 passes through the interior of the intermediate shaft 147 and is rotatably supported on the upper case 8a by the bearings 156 and 157. The bearings 156 are disposed outside of the bearings 146 on the side wall 9d of the case segment 9a. The bearings 157 are disposed on the side wall 9f of the case segment 9c. An end of the output shaft 151 projects out from the upper case 8a but into the interior of the main frame 20. The third sprocket 148 is mounted on the end on the output shaft 151.

The sun gear 152 is mounted to the output shaft 151 by a spline coupling on a side of the intermediate shaft 147. The internal gear 153 is fixed in the interior of the case segment 9c coaxially with the output shaft 151 and outside of the sun gear 152. The planetary gears 154 are disposed between the sun gear 152 and the internal gear 153 and engaged therewith. The pair of carriers 155a and 155b clamp and couple the three planetary gears 154, and are connected to the first transmission portion 131 so as to orbit the three planetary gears 154 around the sun gear 152 in cooperation with the first transmission portion 131.

The third transmission portion 133 includes the output third sprocket 148 mounted on the projecting end of the output shaft 151, a fourth sprocket (not shown) mounted on the rear wheel 13, and a chain 149 extending between the third and fourth sprockets. The number of teeth on the third sprocket 148 is the same as that on the fourth sprocket mounted on the rear wheel 13.

The left carrier 155a is coupled with the intermediate gear 147, and the planetary gears 154 are orbited around the sun gear 152. If, for example, the number of teeth on the sun gear 152 is set at 16, the number of teeth on the planetary gears 154 is set at 16, and the number of teeth on the internal gear 153 is set at 32, the gear ratio is given by (32+16)/16=3. Here, by using the planetary gear mechanism 150, it is possible to obtain a high speed ratio with a compact structure.

The operation of the bicycle according to the third embodiment of the present invention will now be described.

When the rider pushes the pedals 36 to rotate the crank 30, the first sprocket 141 is rotated, so that the rotation is transmitted to the second sprocket 142 through the chain 143. The planetary gears 154 are orbited through the carriers 155a and 155b of the planetary gear mechanism 150 so that the sun gear 152 is rotated. This rotation is transmitted to the rear wheel 13 through the output shaft 147, the third sprocket 148 and the chain 149. As a result, the rear wheel 13 is rotated three times as fast as that of the rotation of the crank 30 so that the bicycle 1 is advanced.

In the bicycle of this embodiment, since the drive portion is enclosed within the frame 2, a chain cover or the like is unnecessary. Thus, the rider's clothing will not be soiled or entangled by the chain and the sprocket. In addition, since the chain 143 does not extend directly from the first sprocket 41 to the fourth sprocket on the rear wheel as on a conventional bicycle, there is additional space between the bottom of the drive case 8 and the ground. And unlike on a conventional bicycle, there is also a space between the drive case 8 and the rear wheel 13. Thus, even if the bicycle rides over a curb or other large object, there is almost no fear that there will be damage to the chains 143 or 149, or the seat stay 22.

The third embodiment of the present invention may be modified in a number of ways. For example, it is also possible to further accelerate the rotation of the third transmission portion 133 by increasing the number of teeth of the third sprocket 148 to exceed the number of teeth on the fourth sprocket mounted on the rear wheel 13. It is also possible to reduce the gear ratio in the second transmission portion 132, it is possible to reduce the diameter of the internal gear 153 and to make the drive portion 334 more compact.

In addition, the structures of the first and third transmission portions 131 and 133 are not limited to a chain and sprocket. It is possible to use any other suitable mechanism such as a bevel gear, a belt mechanism or the like.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A bicycle comprising:
   a frame having a drive case, said drive case mounted on said frame such that at least part of said drive case is disposed in an interior of said frame;
   a running portion, said running portion including a rear wheel mounted on a rear portion of said frame; and
   a drive portion, said drive portion including
   a crank rotatably supported on said drive case;
   a first transmission means disposed in said drive case; and
   a second transmission means;
   wherein said first transmission means rotates said second transmitting means at a rotational speed higher than a rotational speed of said crank, and said second transmission means rotates said rear wheel
   wherein said frame includes a hollow main frame defining at least part of said drive case;
   a rear end of said main frame includes a hollow seat stay bifurcated downward at an oblique angle therefrom;
   and said second transmission means is disposed in an interior of said seat stay.

2. The bicycle according to claim 1, wherein said first transmission means includes
   a first sprocket mounted on said crank, said first sprocket having a plurality of teeth;
   a second sprocket connected to said second transmission means and disposed within said drive case, said second sprocket having a plurality of teeth; and
   a chain extending between said first sprocket and said second sprocket;
   wherein said first sprocket has more teeth than said second sprocket.

3. The bicycle according to claim 1, wherein said first transmission means includes
   a first bevel gear mounted on said crank within the drive case, said first bevel gear having a plurality of teeth;
   a shaft, said shaft having a second bevel gear and a third bevel gear disposed on both ends thereof, said second bevel gear and said third bevel gear having a plurality of teeth, and said second bevel gear engaged with said first bevel gear; and
   a fourth bevel gear connected to said second transmission means, said fourth bevel gear having a plurality of teeth and engaged with said third bevel gear;
   wherein said first bevel gear has more teeth than said second bevel gear, and said third bevel gear has more teeth than said fourth bevel gear.

4. The bicycle according to claim 1, wherein:
   said drive portion includes a crank rotatably supported on said drive case, and said second transmission means includes a planetary gear mechanism disposed within said drive case, and a third transmission means;
   wherein said first transmission means rotates said second transmission means, said second transmitting rotates said third transmission means at a rotational speed higher than the rotational speed of said crank, and said third transmission means rotates said rear wheel.

5. The bicycle according to claim 4, wherein said planetary gear mechanism includes a shaft rotatably supported on said drive case and coupled to said third transmission means, a sun gear fixed to said shaft, an internal gear fixed to said drive case, at least one planetary gear disposed between said sun gear and said internal gear and engaged therewith, and a coupling member coupling said planetary gears together with said first transmission means.

6. The bicycle according to claim 4, wherein said frame is hollow, at least a portion of said drive case is disposed in an interior of said frame, and said second transmission means is disposed within said frame.

7. The bicycle according to claim 4, wherein said third transmission means further increases the rotational speed of said rear wheel.

8. The bicycle according to claim 4, wherein said first speed transmission means includes a first sprocket mounted on said crank within said drive case, a second sprocket connected to said second transmission means, and a chain which extends between said first sprocket and said second sprocket.

9. The bicycle according to claim 1 wherein said second transmission means further increases the rotational speed of said rear wheel.

* * * * *